United States Patent
Tang et al.

(10) Patent No.: US 9,752,728 B2
(45) Date of Patent: Sep. 5, 2017

(54) CRYOGENIC TANK ASSEMBLY

(71) Applicant: General Electric Company, Schenectady, NY (US)

(72) Inventors: Ching-Jen Tang, Niskayuna, NY (US); Laura Michele Hudy, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 846 days.

(21) Appl. No.: 13/722,502

(22) Filed: Dec. 20, 2012

(65) Prior Publication Data
US 2014/0174106 A1    Jun. 26, 2014

(51) Int. Cl.
*F17C 7/04* (2006.01)
*B64D 37/30* (2006.01)

(52) U.S. Cl.
CPC ............. *F17C 7/04* (2013.01); *B64D 37/30* (2013.01); *F17C 2201/0104* (2013.01);
(Continued)

(58) Field of Classification Search
CPC ...... F17C 7/00; F17C 7/02; F17C 7/04; F17C 9/00; F17C 9/02; F17C 9/04; F17C 2227/0135; F17C 2227/0302; F17C 2227/0309; F17C 2227/0311; F17C 2227/0323; F17C 2227/0388;
(Continued)

(56) References Cited

U.S. PATENT DOCUMENTS 2,964,918 A    12/1960    Hansen et al.
5,127,230 A     7/1992    Neeser et al.
(Continued)

FOREIGN PATENT DOCUMENTS

EP    0508611 A1    10/1992
WO    2012045035 A2    4/2012

OTHER PUBLICATIONS

"Vehicle Fuel Tank System, Liquid Natural Gas—The clean fuel for today and tomorrow", Operations Manual—Nexgen Fueling, a chart Industries Company, NFPA 57 and 59A available from the National Fire Protection Association, www.nfpa.org, 617-770-3000.
(Continued)

*Primary Examiner* — Frantz Jules
*Assistant Examiner* — Brian King
(74) *Attorney, Agent, or Firm* — Pabitra K. Chakrabarti

(57) ABSTRACT

A cryogenic tank assembly includes a cryogenic tank having an internal volume that is configured to contain liquefied natural gas (LNG). The cryogenic tank includes an inlet and an outlet that are each fluidly connected to the internal volume. The assembly includes a recirculation conduit coupled in fluid communication between the inlet and the outlet. The recirculation conduit extends along a path between the inlet and outlet external to the internal volume of the cryogenic tank such that the path is configured to be exposed to an ambient environment of the cryogenic tank. The recirculation conduit is configured to: receive a flow of LNG from the internal volume through the outlet; transfer heat from the ambient environment to the LNG flow to change the LNG flow to a flow of natural gas; and inject the natural gas flow into the internal volume of the cryogenic tank through the inlet.

10 Claims, 9 Drawing Sheets

(52) U.S. Cl.
CPC  *F17C 2201/0128* (2013.01); *F17C 2201/054* (2013.01); *F17C 2203/03* (2013.01); *F17C 2203/032* (2013.01); *F17C 2203/0325* (2013.01); *F17C 2203/0604* (2013.01); *F17C 2203/0626* (2013.01); *F17C 2203/0629* (2013.01); *F17C 2205/0119* (2013.01); *F17C 2205/035* (2013.01); *F17C 2205/0326* (2013.01); *F17C 2205/0329* (2013.01); *F17C 2205/0332* (2013.01); *F17C 2205/0338* (2013.01); *F17C 2205/0397* (2013.01); *F17C 2221/033* (2013.01); *F17C 2223/0161* (2013.01); *F17C 2223/0169* (2013.01); *F17C 2223/033* (2013.01); *F17C 2225/0123* (2013.01); *F17C 2227/0107* (2013.01); *F17C 2227/0135* (2013.01); *F17C 2227/0178* (2013.01); *F17C 2227/0185* (2013.01); *F17C 2227/0302* (2013.01); *F17C 2227/039* (2013.01); *F17C 2227/0381* (2013.01); *F17C 2227/0397* (2013.01); *F17C 2250/01* (2013.01); *F17C 2250/032* (2013.01); *F17C 2265/066* (2013.01); *F17C 2270/0189* (2013.01); *F17C 2270/07* (2013.01)

(58) Field of Classification Search
CPC ........ F17C 2227/039; F17C 2227/0393; F17C 2250/01; F17C 2250/03; F17C 2250/032; F17C 2250/0626; F17C 2270/0186; F17C 2270/0189; F17C 13/08; F17C 13/025; F17C 2221/033; F17C 2221/0161; F17C 11/007; F17C 3/10; F17C 2223/033; F17C 2223/035; F17C 2225/0123; F17C 2225/0161; F17C 2225/033; F17C 2225/035; F17C 2225/036; F17C 2205/0397

USPC ... 62/46.1, 50.1, 50.2, 50.4, 50.6, 50.7, 53.2
See application file for complete search history.

(56) References Cited

U.S. PATENT DOCUMENTS

| | | | |
|---|---|---|---|
| 5,163,409 A | | 11/1992 | Gustafson et al. |
| 5,228,295 A | * | 7/1993 | Gustafson .............. F02B 43/00 123/525 |
| 5,325,894 A | * | 7/1994 | Kooy et al. ...................... 141/4 |
| 5,373,700 A | | 12/1994 | Mcintosh |
| 5,373,702 A | | 12/1994 | Kalet et al. |
| 5,513,961 A | | 5/1996 | Engdahl et al. |
| 5,771,946 A | | 6/1998 | Kooy et al. |
| 6,044,647 A | | 4/2000 | Drube et al. |
| 6,058,713 A | | 5/2000 | Bowen et al. |
| 6,125,637 A | | 10/2000 | Bingham et al. |
| 6,505,469 B1 | * | 1/2003 | Drube ...................... F17C 7/04 62/48.1 |
| 6,698,211 B2 | | 3/2004 | Gustafson |
| 7,114,342 B2 | | 10/2006 | Oldham et al. |
| 7,135,048 B1 | * | 11/2006 | Edlund et al. ............... 48/127.1 |
| 2002/0083719 A1 | * | 7/2002 | Hughes et al. ................ 62/49.1 |
| 2002/0170297 A1 | * | 11/2002 | Quine ...................... F17C 7/04 62/50.2 |
| 2007/0006597 A1 | * | 1/2007 | Zia ........................... F17C 7/02 62/48.2 |
| 2009/0283427 A1 | * | 11/2009 | Farone .............................. 206/7 |

OTHER PUBLICATIONS

PCT Search Report and Written Opinion issued Apr. 17, 2014 in connection with corresponding PCT Patent Application No. PCT/US2013/070542.

* cited by examiner

CRYOGENIC TANK ASSEMBLY

BACKGROUND

It has been demonstrated that cryogenic fluids may be used on-board aircraft as a fuel source. For example, some aircraft engines, such as the Tu-155 made by Tupolev, were configured to use natural gas as fuel. The natural gas may be stored on-board the aircraft as liquid natural gas (LNG), which is a cryogenic fluid. LNG can be stored on-board aircraft within a cryogenic tank that holds a volume of the LNG. A pump typically dispenses LNG from the internal volume of the cryogenic tank and supplies the LNG to the aircraft engine as natural gas via piping. But, as the level of LNG within the internal volume of the cryogenic tank decreases, the surface pressure exerted on the surface of the LNG may decrease. Such a decrease in pressure within the internal volume of the cryogenic tank may cause pressure variations downstream of the pump during operation of the aircraft engine. In other words, the pressure of natural gas supplied to the aircraft engine may vary over time, which may decrease the performance and/or disrupt operation of the aircraft engine. Moreover, decreasing pressure within the internal volume of the cryogenic tank may cause the pump to cavitate. For example, the decreasing pressure may reduce subcooling of LNG at the pump inlet. In addition or alternative to decreasing the reliability and/or increasing the cost of operating the pump, pump cavitation may decrease performance and/or disrupt operation of the pump.

BRIEF DESCRIPTION

In one embodiment, a cryogenic tank assembly includes a cryogenic tank having an internal volume. The cryogenic tank is configured to contain liquid natural gas (LNG) within the internal volume. The cryogenic tank includes an inlet fluidly connected to the internal volume and an outlet fluidly connected to the internal volume. The cryogenic tank assembly includes a recirculation conduit coupled in fluid communication between the inlet and the outlet of the cryogenic tank such that the recirculation conduit fluidly connects the inlet to the outlet. The recirculation conduit extends along a path between the inlet and outlet external to the internal volume of the cryogenic tank such that the path of the recirculation conduit is configured to be exposed to an ambient environment of the cryogenic tank. The recirculation conduit is configured to: receive a flow of LNG from the internal volume through the outlet; transfer heat from the ambient environment to the LNG flow to change the LNG flow to a flow of natural gas; and inject the natural gas flow into the internal volume of the cryogenic tank through the inlet.

In another embodiment, an aircraft includes an airframe and a cryogenic tank assembly on-board the airframe. The cryogenic tank assembly includes a cryogenic tank having an internal volume. The cryogenic tank is configured to contain liquefied natural gas (LNG) within the internal volume. The cryogenic tank includes an inlet fluidly connected to the internal volume. The cryogenic tank assembly includes a pressure regulation system, which includes a source of LNG. The pressure regulation system also includes a conduit coupled in fluid communication between the source of LNG and the inlet of the cryogenic tank such that the conduit fluidly connects the source of LNG to the inlet. The conduit extends along a path between the source of LNG and the inlet that is exposed to an ambient environment of the cryogenic tank. The pressure regulation system is configured to: receive a flow of LNG from the source of LNG into the conduit; transfer heat from the ambient environment to the LNG flow to change the LNG flow to a flow of natural gas; and inject the natural gas flow into the internal volume of the cryogenic tank through the inlet.

In another embodiment, a method is provided for regulating pressure within a cryogenic tank having an internal volume that contains liquefied natural gas (LNG). The method includes receiving a flow of LNG from the internal volume of the cryogenic tank into a recirculation conduit that is coupled in fluid communication with an outlet of the cryogenic tank, changing the flow of LNG within the recirculation conduit to a flow of natural gas by transferring heat from an ambient environment of the cryogenic tank to the LNG flow within the recirculation conduit, and injecting the natural gas flow into the internal volume of the cryogenic tank through an inlet of the cryogenic tank to regulate the amount of pressure within the internal volume.

DETAILED DESCRIPTION

Figure 1:
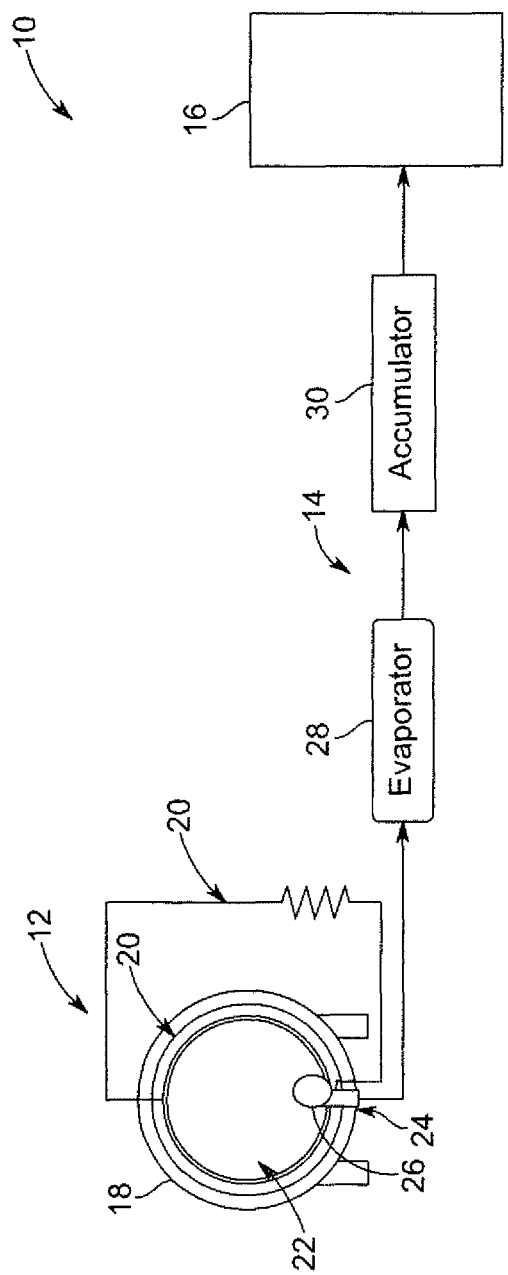
FIG. 1 is a schematic diagram of a delivery system.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, memories, and/or the like) may be implemented in a single piece of hardware (e.g., a general purpose signal processor, random access memory, hard disk, and/or the like) or multiple pieces of hardware. Similarly, any programs may be stand-alone programs, may be incorporated as subroutines in an operating system, may be functions in an installed software package, and/or the like. It should be understood that the various embodiments are not limited to the arrangements and instrumentality shown in the drawings.

As used herein, the term "system" may include a hardware and/or software system that operates to perform one or more functions. For example, a system may include a computer, processor, controller, and/or other logic-based device that performs operations based on instructions stored on a tangible and non-transitory computer readable storage medium, for example a computer memory. Alternatively, a system may include a hard-wired device that performs operations based on hard-wired logic of the device. The systems, computers, and controllers shown in the attached figures may represent the hardware that operates based on software or hardwired instructions, the software that directs hardware to perform the operations, or a combination thereof. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide methods and systems for regulating the amount of pressure within the internal volume of a cryogenic tank. For example, embodiments describe receiving a flow of liquefied natural gas (LNG) from the internal volume of the cryogenic tank and/or another source of LNG, changing the LNG flow to a flow of natural gas by transferring heat from the ambient environment of the cryogenic tank to the LNG flow, and injecting the natural gas into the internal volume to regulate the amount of pressure within the internal volume. At least one technical effect of various embodiments is delivering a more uniform (i.e., less variable) amount of pressure of natural gas and/or LNG to a device that uses LNG and/or natural gas. For example, at least one technical effect of various embodiments is reducing the oscillating magnitude of the pressure of natural gas entering the device. Delivering a more uniform amount of pressure to the device may increase the performance of the device. At least one other technical effect of various embodiments is preventing or reducing cavitation of a pump. For example, at least one technical effect of various embodiments is increasing the net pressure suction head of the pump. Reducing pump cavitation may increase the reliability and/or performance of the pump, and/or may decrease the cost of the pump. At least one technical effect of various embodiments is increasing the reliability and/or reducing the cost of a delivery system (e.g., the delivery circuit and cryogenic tank assemblies described below) that delivers LNG and/or natural gas from the cryogenic tank to the device. At least one other technical effect of various embodiments is enabling the use of relatively light-weight and/or relatively low-pressure cyrogenic tanks (such as, but not limited to, membrane-type tanks and/or the like), for example without venting boil-off gas during pump idling.

FIG. 1 is a schematic diagram of a delivery system 10. The delivery system 10 includes a cryogenic tank assembly 12 and a delivery circuit 14 for LNG from the cryogenic tank assembly 12 to a device 16 that utilizes (e.g., consumes and/or stores) natural gas and/or LNG. As used herein, the delivery circuit 14 refers to the delivery mechanism for transferring the LNG from the tank 12 to the device 16. The cryogenic tank assembly 12 includes a cryogenic tank 18 and a pressure regulation system 20, which will be described in more detail herein with respect to FIGS. 2-9.

The cryogenic tank 18 includes an internal volume 22 and is configured to contain LNG, which is a cryogenic fluid, within the internal volume 22. The cryogenic tank 18 includes one or more outlets 24 for dispensing LNG from the internal volume 22 of the cryogenic tank 18. The outlet 24 may include one or more various flow control components for controlling the dispensing of LNG from the internal volume 22, such as, but not limited to, valves, nozzles, restrictors, venturis, check valves, sensors, manual shutoffs, automatic shutoffs, and/or the like. In some embodiments, the cryogenic tank 18 is a fuel tank for a device 16 that uses LNG and/or natural gas as fuel. For example, the cryogenic tank 18 may be a fuel tank on-board an aircraft (e.g., the aircraft 500 shown in FIG. 8) for containing LNG that is used as fuel (whether as LNG or as natural gas) by an engine (e.g., the engine 502 shown in FIG. 8) of the aircraft. But, the cryogenic tank 18 is not limited to being a fuel tank. Rather, the cryogenic tank 18 may have any other application.

The delivery circuit 14 is configured to deliver the LNG contained in the cryogenic tank 18 to the device 16. Specifically, the delivery circuit 14 is coupled in fluid communication between the outlet 24 of the cryogenic tank 18 and the device 16. The fluid communication between the delivery circuit 14 and the outlet 24 enables the delivery circuit 14 to receive a flow of LNG from the internal volume 22 of the cryogenic tank 18. The delivery circuit 14 may deliver the flow of LNG received from the cryogenic tank 18 to the device 16 as LNG and/or as natural gas. Specifically, in some embodiments, the delivery circuit 14 changes the flow of LNG received from the cryogenic tank 18 to natural gas and delivers the natural gas to the device 16. In other embodiments, the delivery circuit 14 does not change the flow of LNG received from the cryogenic tank 18 to natural gas and instead supplies the flow of LNG to the device 16. In still other embodiments, the delivery circuit 14 only changes some of the flow of LNG received from the cryogenic tank 18 to natural gas and supplies both the unchanged LNG and the natural gas to the device 16. In embodiments wherein the delivery circuit 14 delivers natural gas to the device 16, the natural gas is optionally compressed natural gas (CNG).

The delivery circuit 14 may include one or more various flow control components for delivering the flow of LNG received from the cryogenic tank 18 to the device 16 (whether as LNG and/or natural gas), such as, but not limited to, pumps, conduits, pipes, hoses, nozzles, valves, restrictors, conditioners (e.g., condensers, evaporators, accumulators, plenums, venturis, and/or the like), blowouts, check valves, sensors, manual shutoffs, automatic shutoffs, and/or the like. Although shown as having only a single path between the cryogenic tank 18 and the device 16, the delivery circuit 14 may include any number of paths between the cryogenic tank 18 and the device 16.

The delivery system 10 includes one or more pumps 26 for moving LNG from the internal volume 22 of the cryogenic tank 18 into the delivery circuit 14, and for moving LNG and/or natural gas through the delivery circuit 14 to the device 16. In the exemplary embodiment of the delivery circuit 14, the delivery circuit 14 includes an evaporator 28 and an accumulator 30. Although shown as being located within the internal volume 22 of the cryogenic tank 18, the pump 26 may have any other location within the delivery system 10 (e.g., within the delivery circuit 14) that enables the pump to move LNG from the cryogenic tank 18 into and through the delivery circuit 14. In one example, the pump 26 is located proximate the device 16. Moreover, the delivery system 10 may include one or more other pumps 26 that have the same and/or a different location than within the internal volume 22 of the cryogenic tank 18.

In operation of the exemplary embodiment of the delivery system 10, the pump 26 moves LNG from the internal volume 22 of the cryogenic tank 18 into the delivery circuit 14. The flow of LNG received from the cryogenic tank 18 flows through the delivery circuit 14 into the evaporator 28, wherein the flow of LNG absorbs heat through a heat exchanger (not shown) and thereby changes into a flow of natural gas. The natural gas flows within the delivery circuit 14 from the evaporator 28 to the accumulator 30, wherein oscillation of the natural gas flow is reduced. From the accumulator 30, the natural gas flow is delivered to the device 16 for use thereby. The delivery system 10 may include one or more controllers (not shown) for controlling delivery of the LNG from the cryogenic tank 18 to the device 16 (whether delivered to the device 16 as LNG and/or as natural gas). For example, the controller may be operatively connected to one or more of the various components of the delivery system 10 (e.g., the pump 26, any flow control components of the system 10, and/or the like) for controlling various parameters of the delivery, such as, but not limited to, initiation of delivery, termination of delivery, the flow rate of LNG and/or natural gas within the delivery circuit 14, the amount of LNG and/or natural gas delivered to the device 16, the pressure of LNG and/or natural gas delivered to the device, the duration of delivery of LNG and/or natural gas to the device 16, and/or the like.

The device 16 may be any type of device that uses LNG and/or natural gas (including CNG). Examples of devices 16 that use LNG and/or natural gas include devices that consume LNG and/or natural gas as fuel, such as, but not limited to, engines, generators, heaters, ovens, stoves, lights, other combustion devices, and/or the like. Examples of devices 16 that use LNG and/or natural gas also include devices that store LNG and/or natural gas as fuel, such as, but not limited to, a tank that stores natural gas, a tank that stores LNG, and/or the like. For example, in some embodiments, the delivery circuit 14 delivers a flow of natural gas derived from the LNG contained within the cryogenic tank 18 to a storage tank that stores natural gas.

Although only a single device 16 and a single delivery circuit is shown in FIG. 1, the delivery system 10 may include any number of devices 16 and may include any number of delivery circuits 14. In one example, there are two or more delivery circuits 14 that can deliver the LNG and/or natural gas to the device 16. The multiple delivery circuits 14 in one embodiment provide redundancy. In embodiments wherein the delivery system 10 includes more than one device 16, each device 16 may be fluidly connected to the cryogenic tank 18 through the same delivery circuit 14, or one or more of the devices 16 may be fluidly connected to the cryogenic tank 18 through a different delivery circuit 14 than one or more other devices 16. Moreover, in embodiments wherein the delivery system 10 includes more than one device 16, each device 16 may receive natural gas and/or LNG from the corresponding delivery circuit 14. Accordingly, in some embodiments, one or more devices 16 of the delivery system 10 receive LNG and one or more other devices 16 of the delivery system 10 receive natural gas. In a further embodiment, there is more than one cryogenic tank 18 that is used to store the LNG.

Figure 2:
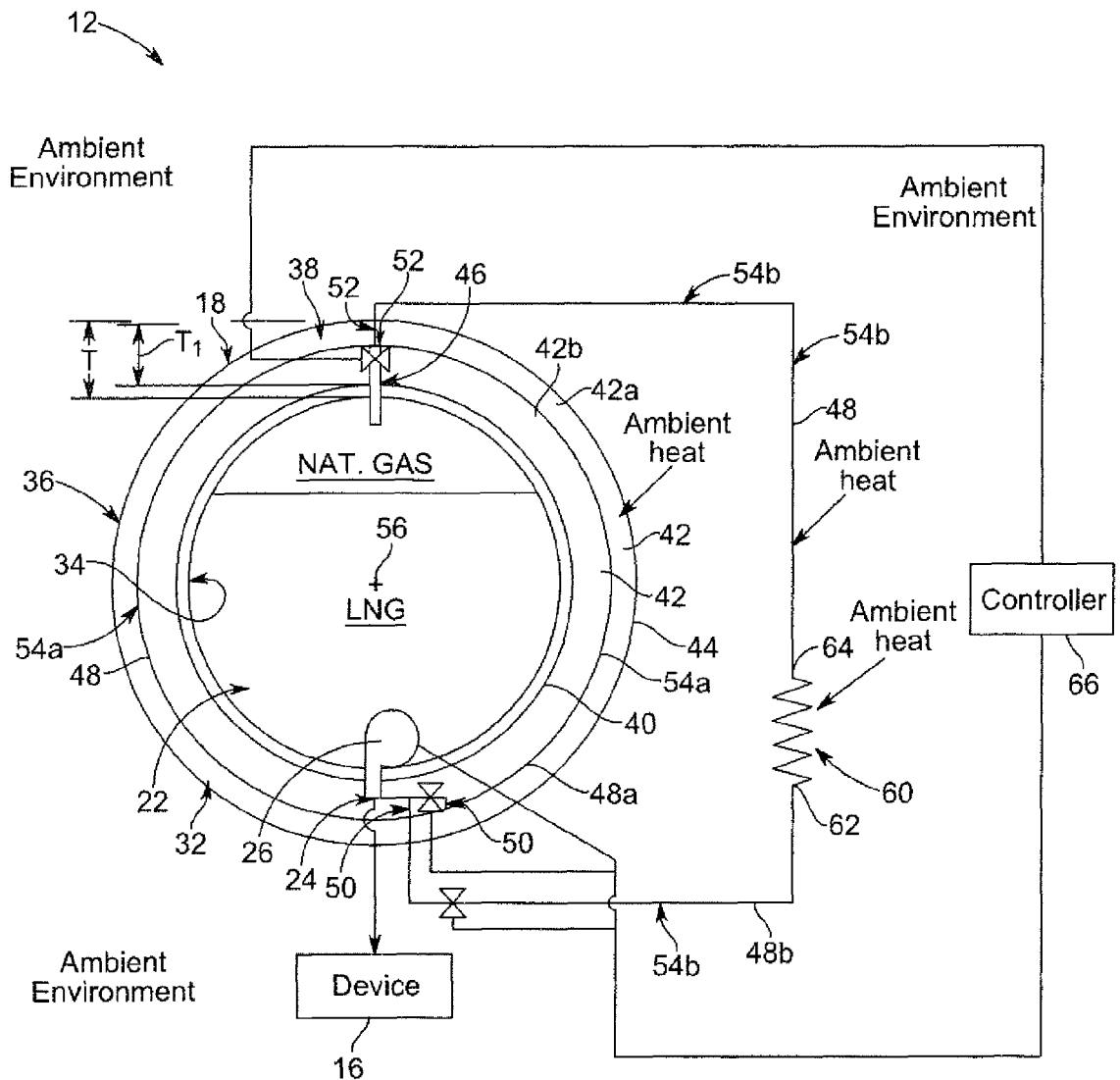
FIG. 2 is schematic diagram of an exemplary embodiment of a cryogenic tank assembly of the delivery system shown in FIG. 1.

FIG. 2 is schematic diagram of an exemplary embodiment of the cryogenic tank assembly 12. As briefly described, the cryogenic tank assembly 12 includes the cryogenic tank 18. The cryogenic tank 18 includes a shell 32 having an internal side 34 and an external side 36 that is opposite the internal side 34. The shell 32 defines the internal volume 22 of the cryogenic tank 18. The internal volume 22 is bounded by the internal side 34 of the shell 32. The external side 36 is configured to be directly exposed to the ambient environment of the cryogenic tank 18. The internal side 34 and the external side 36 of the shell 32 define internal and external sides, respectively, of the cryogenic tank 18. In the exemplary embodiment of the cryogenic tank 18, the cryogenic tank 18 is shown as including a circular cross-sectional shape that may be defined by an overall shape of the cryogenic tank 18 that is cylindrical or spherical. But, the cryogenic tank 18 is not limited to having a cylindrical shape, a spherical shape, or a circular cross-sectional shape. Rather, the cryogenic tank 18 may additionally or alternatively include any other shape(s). Optionally, the cyrogenic tank 18 includes a pressure relief valve (not shown) for venting natural gas from the internal volume 22 of the cryogenic tank 18. The controller 66 is optionally operatively connected to the pressure relief valve for controlling operation of the pressure relief valve.

The shell 32 is defined by one or more walls 38 of the cryogenic tank 18. Although only a single continuous wall is shown herein, the shell 32 may be defined by any number of walls 38. The wall 38 extends a thickness T between the external side 36 and the internal side 34 of the shell 32. In other words, the internal side 34 and the external side 36 of the shell 32 define internal and external sides, respectively, of the wall 38. The wall 38 includes an internal cover 40, thermal insulation 42, and an optional external cover 44. In the exemplary embodiment of the wall 38, the internal cover 40 defines the internal side 34 and the external cover 44 defines the external side 36. In some other embodiments, the wall 38 does not include the external cover 44 and the thermal insulation 42 defines the external side 36 of the wall 38.

The thermal insulation 42 is configured to thermally insulate the internal volume 22 of the cryogenic tank from the ambient environment of the cryogenic tank 18. The thickness T of the wall 38 includes the thermal insulation 42 such that the thermal insulation 42 extends within the thickness T of the wall 38. The thermal insulation 42 has a thickness $T_1$, which may have any value and may be selected to provide a predetermined amount of thermal insulation of the internal volume 22 from the ambient environment. In the exemplary embodiment of the wall 38, the thickness $T_1$ of the thermal insulation 42 defines a majority of the thickness T of the wall 38. But, the thickness $T_1$ of the thermal insulation 42 may define any amount of the thickness T of the wall 38. The thermal insulation 42 may have any value of thermal resistance R that enables the thermal insulation 42 to function as described and/or illustrated herein. The thermal resistance R of the thermal insulation 42 may be selected to provide a predetermined amount of thermal insulation of the internal volume 22 from the ambient environment. The thermal insulation 42 may be any type of thermal insulation, such as, but not limited to, multiple-layer insulation (MLI), silver paint, aerogel, and/or the like.

As described above with respect to FIG. 1, the cryogenic tank 18 includes the outlet 24, which is shown in FIG. 2 as being fluidly connected to the device 16. The cryogenic tank 18 also includes one or more inlets 46 fluidly connected to the internal volume 22 for injecting natural gas into the internal volume 22, as will be described below. The inlet 46 may include one or more various flow control components for controlling the injection of natural gas into the internal volume 22, such as, but not limited to, valves, nozzles, restrictors, venturis, check valves, sensors, manual shutoffs, automatic shutoffs, and/or the like.

The cryogenic tank assembly 12 includes the pressure regulation system 20, which as will be described in more detail herein is configured to regulate the amount of pressure within the internal volume 22 of the cryogenic tank 18, such as by injecting natural gas into the internal volume 22 or by releasing natural gas (e.g., using the pressure relief valve described above). The pressure regulation system 20 in one embodiment includes one or more recirculation conduits 48. Each recirculation conduit 48 includes an inlet 50 that is fluidly connected to an outlet (e.g., the outlet 24) of the internal volume 22 of the cryogenic tank 18 for receiving LNG from the internal volume 22. Each recirculation conduit 48 also includes an outlet 52 that is fluidly connected to an inlet (e.g., the inlet 46) of the internal volume 22 for injecting natural gas into the internal volume 22. Each recirculation conduit 48 thereby fluidly connects the corresponding inlet of the cryogenic tank 18 to the corresponding outlet of the cryogenic tank 18. The inlet 50 of each recirculation conduit 48 may include one or more various flow control components for controlling the reception of LNG from the internal volume 22 of the cyrogenic tank 18 into the inlet 50, such as, but not limited to, valves, nozzles, restrictors, venturis, check valves, sensors, manual shutoffs, automatic shutoffs, and/or the like. The outlet 52 of each recirculation conduit 48 may include one or more various flow control components for controlling the injection of natural gas into the internal volume 22 of the cyrogenic tank 18 through the outlet 52, such as, but not limited to, valves, nozzles, restrictors, venturis, check valves, sensors, manual shutoffs, automatic shutoffs, and/or the like.

In the exemplary embodiment of the pressure regulation system 20, the pressure regulation system 20 includes two recirculation conduits 48, namely a recirculation conduit 48a and a recirculation conduit 48b. But, the pressure regulation system 20 may include any number of the recirculation conduits 48. The recirculation conduits 48a and 48b are each coupled in fluid communication between the inlet 46 and the outlet 24 of the cryogenic tank 18 in the exemplary embodiments of the recirculation conduits 48a and 48b. Accordingly, the recirculation conduits 48a and 48b each share the outlet 24 with the device 16. Alternatively, one or both of the recirculation conduits 48a and 48b is fluidly connected to the internal volume 22 of the cryogenic tank 18 through a different outlet (not shown) of the cryogenic tank 18 than the device 16 (i.e., a different outlet than the outlet 24). Moreover, the recirculation conduits 48a and 48b need not share the same outlet of the cryogenic tank 18 as each other. For example, the recirculation conduit 48a may be fluidly connected to the internal volume 22 of the cryogenic tank 18 through a different outlet of the cryogenic tank 18 than the recirculation conduit 48b, whether or not either of the recirculation conduits 48a or 48b is fluidly connected to the internal volume 22 through the outlet 24 used by the device 16. Further, the recirculation conduits 48a and 48b need not share the same inlet 46 of the cryogenic tank 18 as each other. For example, the recirculation conduit 48a may be fluidly connected to the internal volume 22 of the cryogenic tank 18 through a different inlet of the cryogenic tank 18 than the recirculation conduit 48b. Each of the recirculation conduits 48a and 48b may be referred to herein as a "first" and/or a "second" recirculation conduit.

The recirculation conduits 48a and 48b each extend along a path 54a and 54b, respectively, between the inlet 46 and the outlet 24 of the cryogenic tank 18. Each of the paths 54a and 54b extends external to the internal volume 22 of the cryogenic tank 18 such that the path 54a and 54b is exposed to the ambient environment of the cryogenic tank 18. Referring first to the recirculation conduit 48a, the path 54a of the recirculation conduit 48a extends within the thickness T of the wall 38 of the cryogenic tank 18. The path 54a follows the contour of the wall 38, which extends around a central axis 56 of the cryogenic tank 18. The path 54a optionally extends through the thermal insulation 42 of the wall 38, as is shown in the exemplary embodiment of FIG. 2. The recirculation conduit 48a is positioned within the thickness T of the wall 38 such that a segment 42a of the thermal insulation 42 extends between the recirculation conduit 48a and the ambient environment of the cryogenic tank 18, and such that another segment 42b of the thermal insulation 42 extends between the recirculation conduit 48a and the internal volume 22 of the cryogenic tank 18. In other words, the segment 42a of the thermal insulation 42 extends radially (relative to the central axis 56) outside the recirculation conduit 48a and the segment 42b extends radially within the recirculation conduit 48a. Each segment 42a and 42b of the thermal insulation 42 has a respective thickness $T_2$ and $T_3$. The paths 54a and 54b may each be referred to herein as a "first" and/or a "second" path.

The recirculation conduit 48a is indirectly exposed to the ambient environment of the cryogenic tank 10 through the segment 42a of the thermal insulation 42. Specifically, one or more various parameters (e.g., the thermal resistance R, the thickness $T_2$, and/or the like) of the segment 42a of the thermal insulation 42 are selected such that at least some heat (e.g., a predetermined amount) from the ambient environment of the cryogenic tank 18 is transferred to the recirculation conduit 48a through the segment 42a. The recirculation conduit 48a is thereby indirectly exposed to the ambient environment through the segment 42a. The various parameters of the segment 42a may be selected for a particular ambient environment within which the cryogenic tank 18 is intended to be used. The thickness $T_2$ and the thermal resistance R of the segment 42a may each have any value that enables the recirculation conduit 48a to function as described and/or illustrated herein.

The recirculation conduit 48a may have any radial position within the thickness T of the wall 38 and any radial position within the thickness $T_1$ of the thermal insulation 42. For example, the thicknesses $T_2$ and $T_3$ may have any value relative to each other. In the exemplary embodiment of the recirculation conduit 48a, the recirculation conduit 48a is positioned within the thickness $T_1$ of the thermal insulation 42 such that the thickness $T_3$ of the segment 42b is greater than the thickness $T_2$ of the segment 42a. The relative values of the thicknesses $T_2$ and $T_3$ may be selected to provide a predetermined amount of thermal insulation to the internal volume 22 from the ambient environment while also enabling a predetermined amount of heat to be transferred from the ambient environment to the recirculation conduit 48a. In some alternative embodiments, the position of the recirculation conduit 48a within the thickness $T_1$ of the thermal insulation 42 is variable along the perimeter of the wall 38 (i.e., along the path 54a) such that the thicknesses $T_2$ and $T_3$ are variable along the perimeter of the wall 38.

Optionally, an approximate entirety of the path 54a of the recirculation conduit 48a from the inlet 50 to the outlet 52 extends within the thickness T of the wall 38, as is shown in the exemplary embodiment of FIG. 2. In other embodiments, one or more segments of the path 54a do not extend within the thickness T of the wall 38. Further, although the approximate entirety of the path 54a from the inlet 50 to the outlet 52 is shown as extending through the thermal insulation 42, in other embodiments one or more segments of the path 54a do not extend through the thermal insulation 42. Moreover, in some alternative embodiments, no segment of the path 54a extends within the thickness $T_1$ of the thermal insulation 42. Rather, in such alternative embodiments, the recirculation conduit 48a is positioned radially relative to the central axis 56 such that the recirculation conduit 48*a* extends radially outside the thickness $T_1$ of the thermal insulation 42, whether the recirculation conduit 48*a* extends radially within or radially outside the cover 44.

Figure 3:
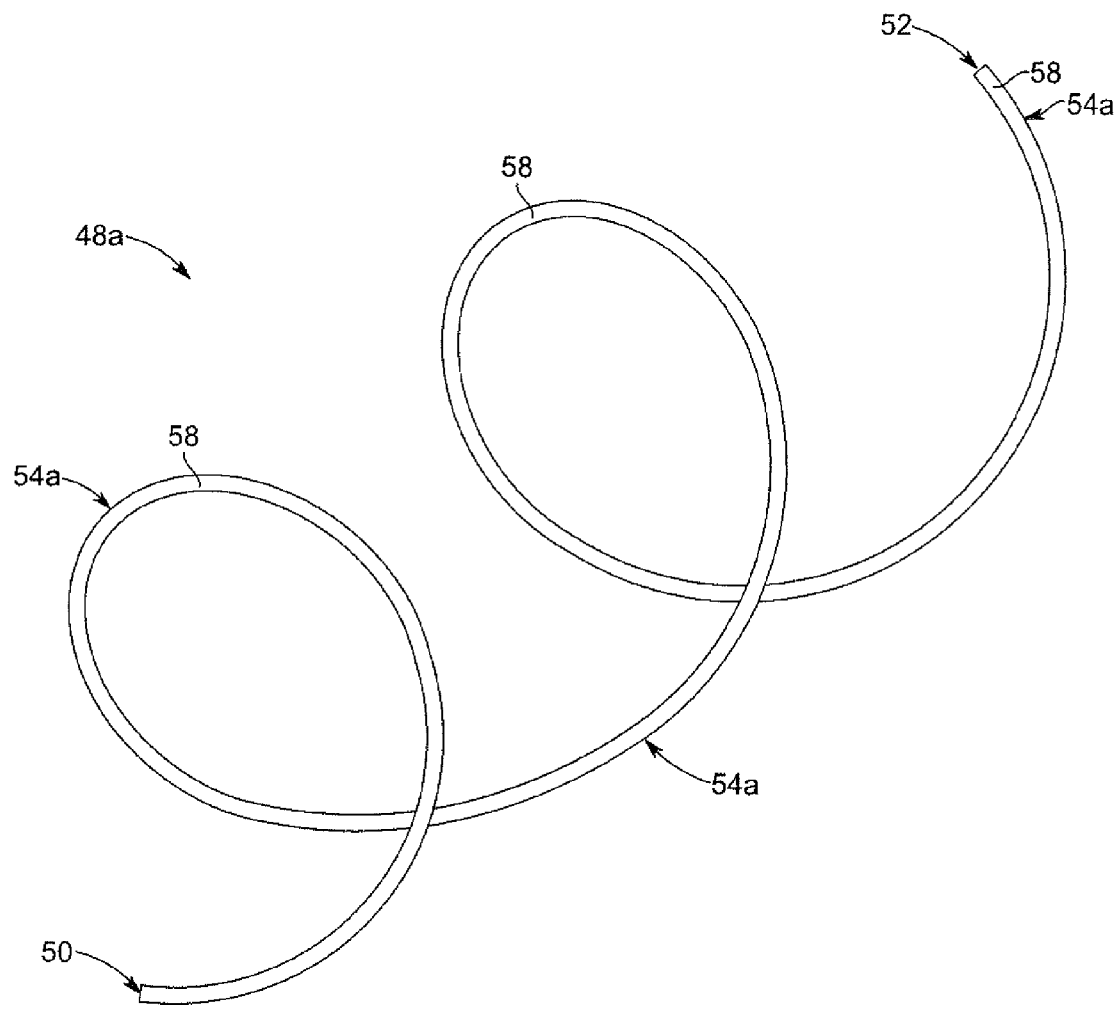
FIG. 3 is a perspective view of an exemplary embodiment of a recirculation conduit of the cryogenic tank assembly shown in FIG. 2.

The path 54*a* of the recirculation conduit 48*a* may include any shape. In the exemplary embodiment of the recirculation conduit 48*a*, the recirculation conduit 48*a* is a coil that extends around internal volume 22 of the cryogenic tank 18 such that the path 54*a* of the recirculation conduit 48*a* includes a spiral (i.e., helical) shape. For example, FIG. 3 is a perspective view of the recirculation conduit 48*a*. The cryogenic tank 18 (shown in FIGS. 1, 2, and 4-8), the recirculation conduit 48*b* (shown in FIGS. 2 and 5-7), and the device 16 (shown in FIGS. 1, 2, and 4-7) have been removed from FIG. 3 to better illustrate the path 54*a* of the recirculation conduit 48*a*. The recirculation conduit 48*a* extends along the path 54*a* from the inlet 50 of the recirculation conduit 48*a* to the outlet 52 of the recirculation conduit 48*a*. As can be seen in FIG. 3, the recirculation conduit 48*a* is a coil that includes one or more winding turns 58 that are wrapped around the internal volume 22 (shown in FIGS. 1, 2, and 4-7) of the cryogenic tank 18, as can be appreciated by considering FIG. 2 in combination with FIG. 3. The winding turns 58 give the path 54*a* of the recirculation conduit 48*a* the spiral shape that can be seen in FIG. 3. Although approximately two and a half are shown, the recirculation conduit 48*a* may include any number of winding turns 58. Moreover, each winding turn 58 may have any length, may have any angle, and may have any spacing relative to adjacent winding turns 58.

Referring again to FIG. 2, examples of other suitable shapes of the path 54*a* of the recirculation conduit 48*a* include, but are not limited to, other curved shapes, shapes having one or more non-zero angles, irregular shapes, non-uniform shapes, partially circular shapes, half-circular shapes, and/or the like.

Referring now to the recirculation conduit 48*b*, the path 54*b* of the recirculation conduit 48*b* extends external to the external side 36 of the cryogenic tank 18 such that the path 54*b* extends within the ambient environment of the cryogenic tank 18, as is shown in FIG. 2. The path 54*b* of the recirculation conduit 48*b* is thereby directly exposed to the ambient environment. At least a segment of the path 54*b* extends within the ambient environment in a spaced apart relationship with the external side 36. In the exemplary embodiment of the recirculation conduit 48*b*, an approximate entirety of the path 54*b* of the recirculation conduit 48*b* extends within the ambient environment in a spaced apart relationship with the external side 36 of the cryogenic tank 18. But, in other embodiments, one or more segments, or an approximate entirety, of the path 54*b* extends within the ambient environment in engagement (i.e., physical contact) with the external side 36 of the cryogenic tank 18. Each of the various segments of the path 54*b* may be spaced apart from the external side 36 by any amount.

The path 54*b* of the recirculation conduit 48*b* may include any shape. In the exemplary embodiment of the recirculation conduit 48*b*, the path 54*b* has the shape of a partial rectangle. Examples of other suitable shapes of the path 54*b* of the recirculation conduit 48*b* include, but are not limited to, other shapes having one or more non-zero angles, spiral shapes, helical shapes, curved shapes, square shapes, irregular shapes, non-uniform shapes, partially circular shapes, partially oval shapes, half-oval shapes, half-circular shapes, and/or the like. The shape of the path 54*b* may be selected to provide a predetermined amount of heat transfer between the ambient environment and the recirculation conduit 48*b*.

Optionally, the pressure regulation system 20 includes a heat exchanger 60. The heat exchanger 60 is coupled in fluid communication with the recirculation conduit 48*b* for transferring heat from the ambient environment to the flow of LNG within the recirculation conduit 48*b*. Specifically, the heat exchanger 60 includes an inlet 62 that is coupled in fluid communication with the recirculation conduit 48*b* for receiving a flow of LNG from the recirculation conduit 48*b*. The heat exchanger 60 includes an outlet 64 that is coupled in fluid communication with the recirculation conduit 48*b* for delivering the flow of LNG and/or natural gas back into the recirculation conduit 48*b*. The heat exchanger 60 is configured to transfer heat from the ambient environment to the flow of LNG received from the recirculation conduit 48*b*. In some embodiments, the heat exchanger 60 transfers a sufficient amount of heat to the flow of LNG received from the recirculation conduit 48*b* such that the LNG flow is changed within the heat exchanger 60 into a flow of natural gas.

Although shown as being coupled in series along the path 54*b* of the recirculation conduit 48*b*, alternatively the heat exchanger 60 is coupled in parallel with a bypass segment (not shown) of the recirculation conduit 48*b* that bypasses the heat exchanger 60. The heat exchanger 60 may be any type of heat exchanger 60, such as, but not limited to, a shell and tube heat exchanger, a plate heat exchanger, a plate and shell heat exchanger, a plate fin heat exchanger, a pillow plate heat exchanger, a fluid heat exchanger, a dynamic scrapped surface heat exchanger, a phase-change heat exchanger, a spiral heat exchanger, and/or the like. Although only a single heat exchanger 60 is shown, the pressure regulation system 20 may include any number of the heat exchangers 60, each of which may be coupled in series or parallel. Various parameters of the heat exchanger 60 may be selected to provide a predetermined amount of heat transfer from the ambient environment to the flow of LNG received by the heat exchanger 60.

The pressure regulation system 20 optionally includes one or more of the pumps 26 for moving LNG from the internal volume 22 of the cryogenic tank 18 into the recirculation conduits 48 of the pressure regulation system 20, for moving LNG and natural gas through the recirculation conduits 48, and for injecting natural gas into the internal volume 22 of the cryogenic tank 18. Although shown as being the same pump 26 used to move LNG and/or natural gas through the delivery circuit 14 (shown in FIG. 1), the pressure regulation system 20 may use one or more pumps (not shown) that are not shared by the delivery circuit 14. Moreover, the pump(s) 26 used by the pressure regulation system 20 are not limited to being located within the internal volume 22 of the cryogenic tank 18, but rather may have any other location within the pressure regulation system 20 (e.g., within a recirculation conduit 48) that enables the pump 26 to move LNG from the internal volume 22 into the one or more recirculation conduits 48, to move LNG and natural gas through one or more recirculation conduits 48, and/or to inject natural gas into the internal volume 22. In some embodiments, the pressure regulation system 20 does not include a pump, but rather the ambient heat may drive movement of LNG from the internal volume 22 of the cryogenic tank 18 into the recirculation conduits 48, movement of LNG and natural gas through the recirculation conduits 48, and injection of natural gas into the internal volume 22 of the cryogenic tank 18. For example, the ambient heat may change some of the LNG within the recirculation conduits 48 into vapor, which will cause the average density of LNG within the internal volume 22 of the cryogenic tank 18 to be higher than the average density of the two-phase fluid within the recirculation conduits 48. The difference in average densities results in a hydraulic pressure difference between the fluid in the internal volume 22 of the cryogenic tank 18 and the fluid in the recirculation conduits 48. The hydraulic pressure difference between the fluid in the internal volume 22 of the cryogenic tank 18 and the fluid in the recirculation conduits 48 will drive movement of LNG from the internal volume 22 of the cryogenic tank 18 into the recirculation conduits 48, movement of LNG and natural gas through the recirculation conduits 48, and/or injection of natural gas into the internal volume 22 of the cryogenic tank 18.

The pressure regulation system 20 optionally includes one or more controllers 66 for regulating the pressure within the internal volume 22 of the cryogenic tank 18 by controlling the amount and/or pressure of natural gas injected into the internal volume 22. For example, the controller 66 may be operatively connected to one or more of the various components of the cryogenic tank assembly 12 (e.g., the pump 26, any flow control components of the cryogenic tank assembly 12, and/or the like) for controlling various parameters of the operation of the pressure regulation system 20, such as, but not limited to, initiation of injection, termination of injection, the flow rate of LNG and/or natural gas within the pressure regulation system 20, the amount of natural gas injected into the internal volume 22, the pressure of natural gas injected into the internal volume 22, the duration of injection, and/or the like. The pressure regulation system 20 may include any number of the controllers 66. Optionally, the controller 66 is also used for controlling at least some of the operations of the delivery system 10. The controller 66 may be referred to herein as a "computer".

In operation, the pressure regulation system 20 is used to regulate the pressure within the internal volume 22 of the cryogenic tank 18 by injecting natural gas into the internal volume 22. Specifically, the inlet 50 of the recirculation conduit 48a receives a flow of LNG from the internal volume 22 of the cryogenic tank 18 through the outlet 24 of the cryogenic tank 18. As the LNG flows along the path 54a of the recirculation conduit 48a, heat from the ambient environment of the cryogenic tank 18 is transferred to the LNG flow through the segment 42a of the thermal insulation 42. At some point along the path 54a, a sufficient amount of heat is transferred to the LNG flow to change the LNG flow to a flow of natural gas. The natural gas flow within the recirculation conduit 48a is then injected into the internal volume 22 of the cryogenic tank 18 through the outlet 52 of the recirculation conduit 48a and the inlet 46 of the cryogenic tank 18.

Various parameters of the cryogenic tank assembly 12 may be selected to enable a sufficient amount of heat to be transferred from the ambient environment to the LNG flow such that the LNG flow changes to the natural gas flow along the path 54a of the recirculation conduit 48a. Examples of such various parameters include, but are not limited to, the thermal resistance R of the thermal insulation segment 42a, the thickness $T_2$ of the thermal insulation segment 42a, the flow rate of the LNG flow within the recirculation conduit 48a, the cross-sectional size (e.g., diameter and/or the like) of the flow channel of the recirculation conduit 48a, the length of the path 54a of the recirculation conduit 48a, a thermal resistance R and/or thickness of thermal insulation (if any, not shown) of the recirculation conduit 48a, and/or the like. For example, the controller 66 may use the pump 26 to regulate the amount of heat absorbed by the LNG flow by controlling the flow rate of the LNG flow within the recirculation conduit 48a.

In the exemplary embodiment of the cryogenic tank assembly 12, the inlet 50 of the recirculation conduit 48b also receives a flow of LNG from the internal volume 22 of the cryogenic tank 18 through the outlet 24. As the LNG flows along the path 54b of the recirculation conduit 48b, heat from the ambient environment of the cryogenic tank 18 is transferred to the LNG flow. At some point along the path 54b, a sufficient amount of heat is transferred to the LNG flow to change the LNG flow to a flow of natural gas. The natural gas flow within the recirculation conduit 48b is then injected into the internal volume 22 of the cryogenic tank 18 through the outlet 52 of the recirculation conduit 48a and the inlet 46 of the cryogenic tank 18. Optionally, the natural gas flow within the recirculation conduit 48b mixes with the natural gas flow within the recirculation conduit 48a upstream from, and/or at, the inlet 46 of the cryogenic tank 18, as is shown in FIG. 2. Moreover, in some circumstances and/or embodiments, only one of the recirculation conduits 48a or 48b into used to inject natural gas into the internal volume 22 at a given time.

Various parameters of the cryogenic tank assembly 12 may be selected to enable a sufficient amount of heat to be transferred from the ambient environment to the LNG flow such that the LNG flow changes to the natural gas flow along the path 54b of the recirculation conduit 48b. Examples of such various parameters include, but are not limited to, the flow rate of the LNG flow within the recirculation conduit 48b, the cross-sectional size (e.g., diameter and/or the like) of the flow channel of the recirculation conduit 48b, the length of the path 54b of the recirculation conduit 48b, a thermal resistance R and/or thickness of thermal insulation (if any, not shown) of the recirculation conduit 48b, the configuration of the heat exchanger 60, and/or the like. For example, the controller 66 may use the pump 26 to regulate the amount of heat absorbed by the LNG flow by controlling the flow rate of the LNG flow within the recirculation conduit 48b.

The natural gas flow injected into the internal volume 22 from the recirculation conduits 48a and 48b is used to regulate the amount of pressure within the internal volume 22 of the cryogenic tank 18, and more specifically the amount of surface pressure exerted on the LNG contained within the internal volume 22. For example, the natural gas flow may be injected into the internal volume 22 to increase the pressure within the internal volume 22 to an approximate predetermined value and/or within a range of values, and/or to maintain the pressure within the internal volume 22 at the predetermined value and/or within the range. The amount (e.g., flow rate) and/or pressure of the natural gas flow injected into may be selected (e.g., controlled by the controller 66 using the pump 26 and/or one or more flow control components of the assembly 12) to provide the internal volume 22 with the predetermined pressure value and/or within the predetermined range. The predetermined pressure value and/or range provided within the internal volume 22 of the cryogenic tank 18 may be selected to prevent or reduce cavitation of the pump 26 as the pump 26 moves LNG into the delivery system 14 for delivery to the device 16. In addition or alternatively, the predetermined pressure value and/or range provided within the internal volume 22 of the cryogenic tank 18 may be selected to enable the delivery system 14 to deliver a more uniform (i.e., less variable) amount of pressure of LNG and/or natural gas to the device 16.

Figure 4:
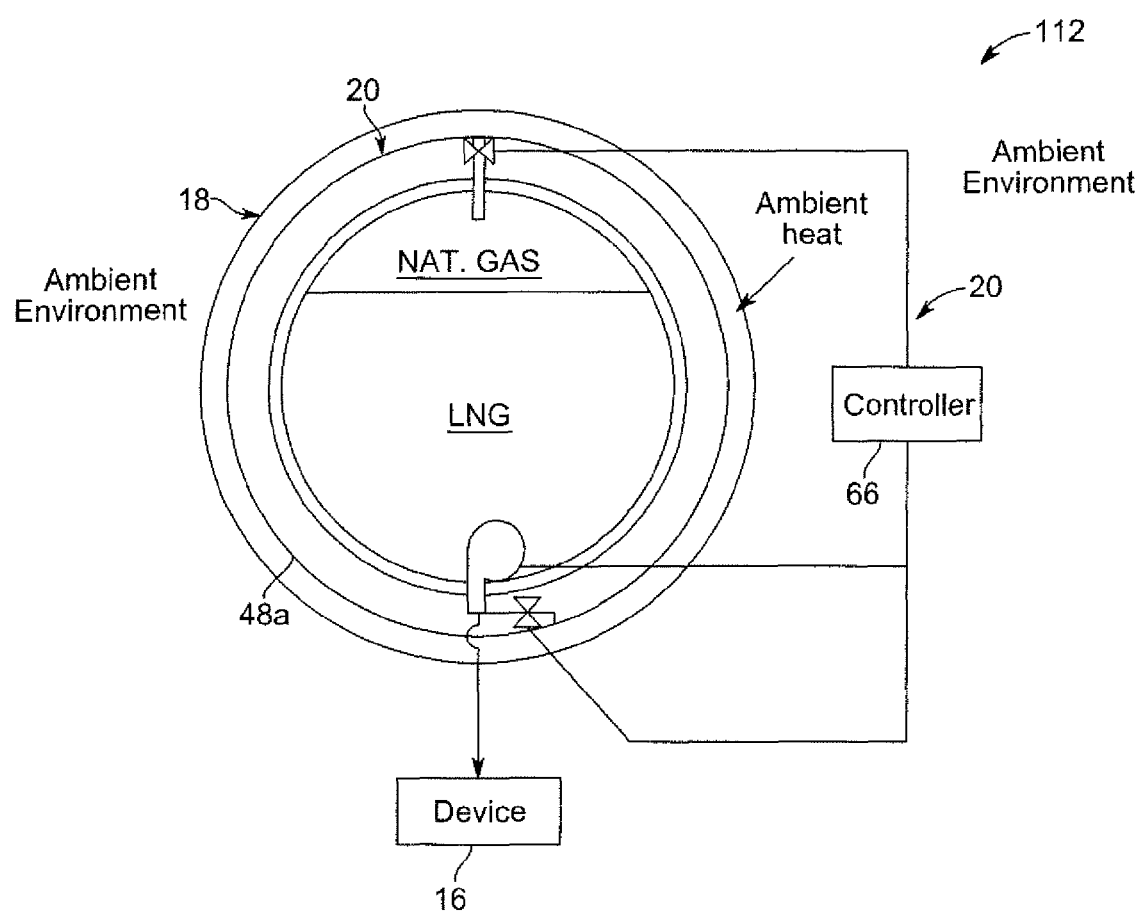
FIG. 4 is schematic diagram of another exemplary embodiment of a cryogenic tank assembly.
Figure 5:
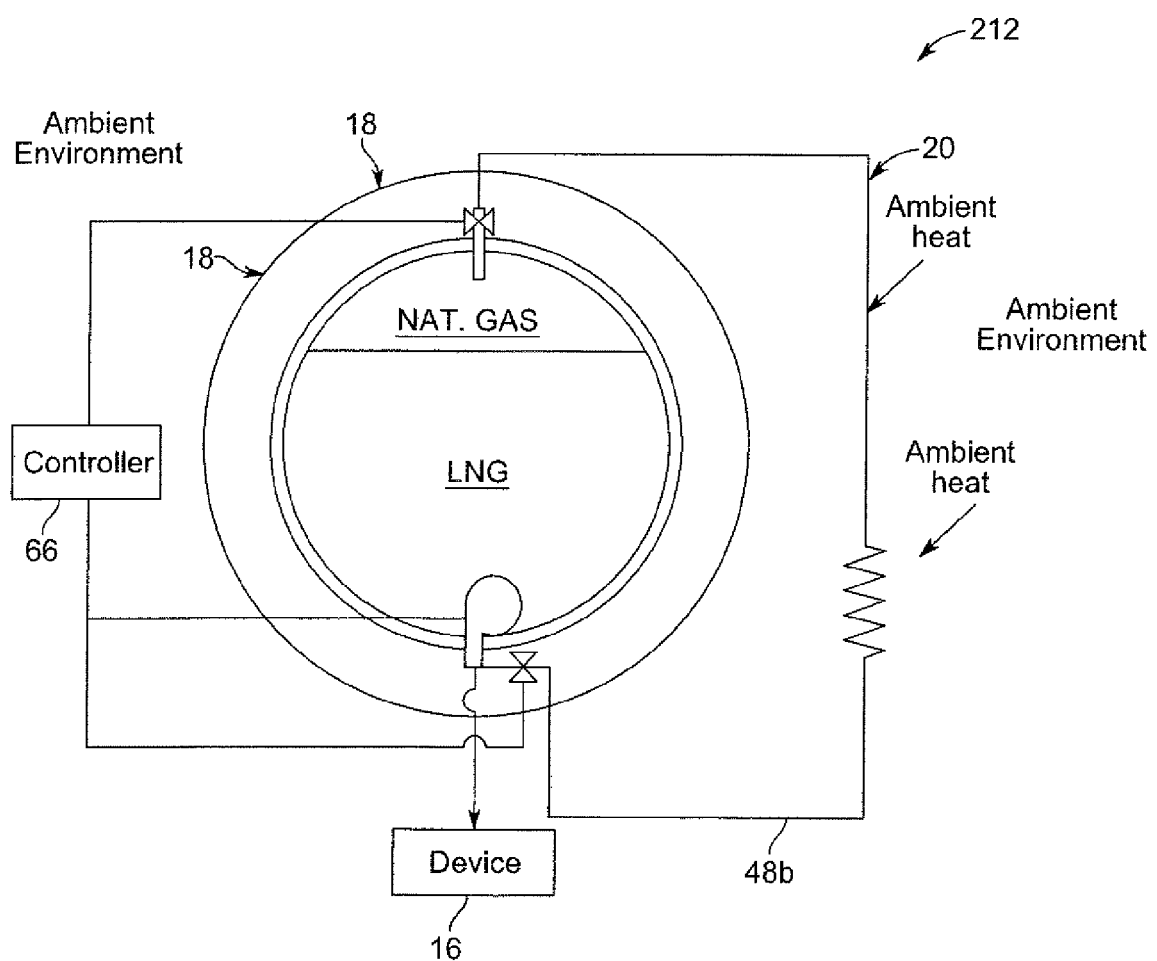
FIG. 5 is schematic diagram of another exemplary embodiment of a cryogenic tank assembly.

In some alternative embodiments, the pressure regulation system 20 of the cryogenic tank assembly 12 does not include the recirculation conduit 48a or does not include the recirculation conduit 48b. For example, FIG. 4 is schematic diagram of another exemplary embodiment of a cryogenic tank assembly 112. The cryogenic tank assembly 112 includes the cryogenic tank 18, the pressure regulation system 20, and the controller 66. In the exemplary embodiment of FIG. 4, the pressure regulation system 20 includes the recirculation conduit 48a, but does not include the recirculation conduit 48b (shown in FIGS. 2 and 5-7). Moreover, and for example, FIG. 5 is schematic diagram of another exemplary embodiment of a cryogenic tank assembly 212 that includes the recirculation conduit 48b but not the recirculation conduit 48a (shown in FIGS. 2-4). Specifically, the cryogenic tank assembly 212 includes the cryogenic tank 18, the pressure regulation system 20, and the controller 66. In the exemplary embodiment of FIG. 5, the pressure regulation system 20 includes the recirculation conduit 48b, but does not include the recirculation conduit 48a.

Figure 6:
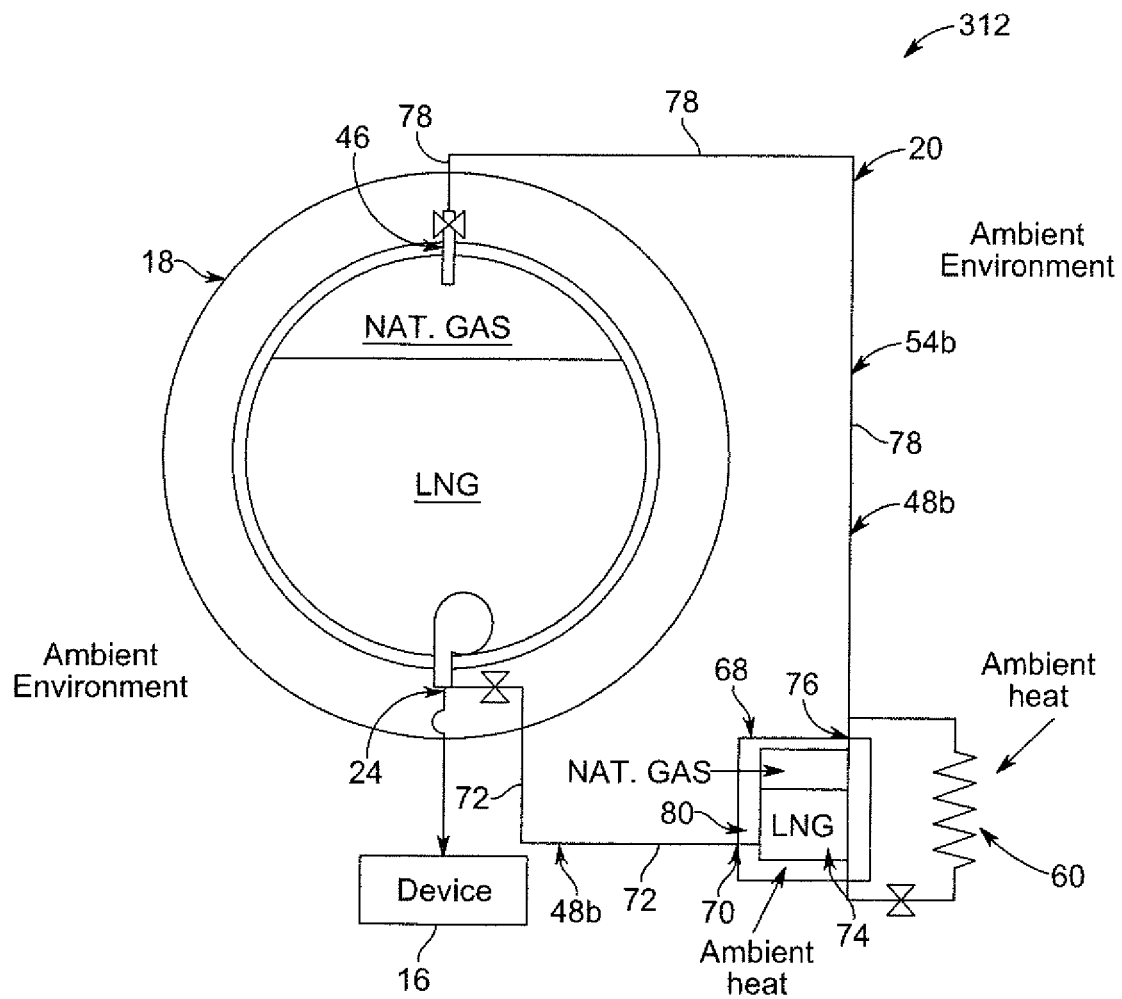
FIG. 6 is schematic diagram of another exemplary embodiment of a cryogenic tank assembly.

FIG. 6 is schematic diagram of another exemplary embodiment of a cryogenic tank assembly 312. The cryogenic tank assembly 312 includes the cryogenic tank 18 and the pressure regulation system 20. The pressure regulation system 20 includes the recirculation conduit 48b and an auxiliary tank 68, which is coupled in fluid communication with the recirculation conduit 48b. Specifically, the auxiliary tank 68 includes an inlet 70 that is coupled in fluid communication with a segment 72 of the recirculation conduit 48b that extends between the outlet 24 of the cryogenic tank 18 and the auxiliary tank 68. The inlet 70 is coupled in fluid communication with an internal chamber 74 of the auxiliary tank 68 that is configured to contain LNG and natural gas. The auxiliary tank 68 includes an outlet 76 that is coupled in fluid communication between the internal chamber 74 and a segment 78 of the recirculation conduit 48b that extends between the auxiliary tank 68 and the inlet 46 of the cryogenic tank 18.

As can be seen in FIG. 6, the auxiliary tank 68 is positioned within the ambient environment of the cryogenic tank 18 such that the auxiliary tank 68 is directly exposed to the conditions of the ambient environment. The auxiliary tank 68 includes one or more layers of thermal insulation 80 configured to thermally insulate the internal chamber 68 from the ambient environment of the cryogenic tank 18. But, various parameters of the cryogenic tank assembly 312 are selected such that a sufficient amount of heat is transferred from the ambient environment to LNG contained within the internal chamber 74 of the auxiliary tank 68 to change at least some of the LNG contained within the internal chamber 74 into natural gas. Examples of such various parameters of the cryogenic tank assembly 312 include, but are not limited to, the thickness and/or thermal resistance R of the thermal insulation 80, the duration of time a given sample of LNG is contained within the auxiliary tank 68, the flow rate LNG and/or natural gas through the auxiliary tank 68, the value of the volume of the internal chamber 74 of the auxiliary tank 68, and/or the like. The various parameters of the cryogenic tank assembly 312 may be selected for a particular ambient environment within which the cryogenic tank 18 is intended to be used. Each of the various parameters of the auxiliary tank 68 may have any value that enables the auxiliary tank 68 to function as described and/or illustrated herein. The thermal insulation 80 may be any type of thermal insulation, such as, but not limited to, multiple-layer insulation (MLI), silver paint, aerogel, and/or the like.

In operation, the inlet 70 of the auxiliary tank 68 receives a flow of LNG into the internal chamber 68 from the segment 72 of the recirculation conduit 48b. The internal chamber 74 contains the LNG for sufficient amount of time such that at least some of the LNG contained within the internal chamber 74 changes to natural gas. The natural gas within the internal chamber 74 is delivered to the segment 78 of the recirculation conduit 48b through the outlet 76 for ultimately being injected into the internal volume 22 of the cryogenic tank 18.

Although shown as being coupled in series along the path 54b of the recirculation conduit 48b, alternatively the auxiliary tank 68 is coupled in parallel with a bypass segment (not shown) of the recirculation conduit 48b that bypasses the auxiliary tank 68. The pressure regulation system 20 may include any number of the auxiliary tanks 68, each of which may be coupled in series or parallel. The inlet 70 and the outlet 76 of the auxiliary tank 68 each may include one or more various flow control components, such as, but not limited to, valves, nozzles, restrictors, venturis, check valves, sensors, manual shutoffs, automatic shutoffs, and/or the like.

In the exemplary embodiment of the cryogenic tank assembly 312, the heat exchanger 60 in included. The heat exchanger 60 is illustrated as being coupled in fluid communication between the internal chamber 74 of the auxiliary tank 68 and the segment 78 of the recirculation conduit 48b. The heat exchanger 60 is configured to receive LNG from the internal chamber 74. The LNG passes into the heat exchanger 60 and absorbs heat as described above. Optionally, the LNG is changed to natural gas within the heat exchanger 60. The heat exchanger 60 outputs LNG and/or natural gas into the segment 78 of the recirculation conduit 48b. In other embodiments, the heat exchanger 60 is fluidly coupled to the recirculation conduit 48b in parallel with the auxiliary tank 68 or in series with the auxiliary tank 68 (whether or not the heat exchanger 60 and/or the auxiliary tank 68 is coupled in parallel with a bypass segment, not shown, of the recirculation conduit 48b).

Figure 7:
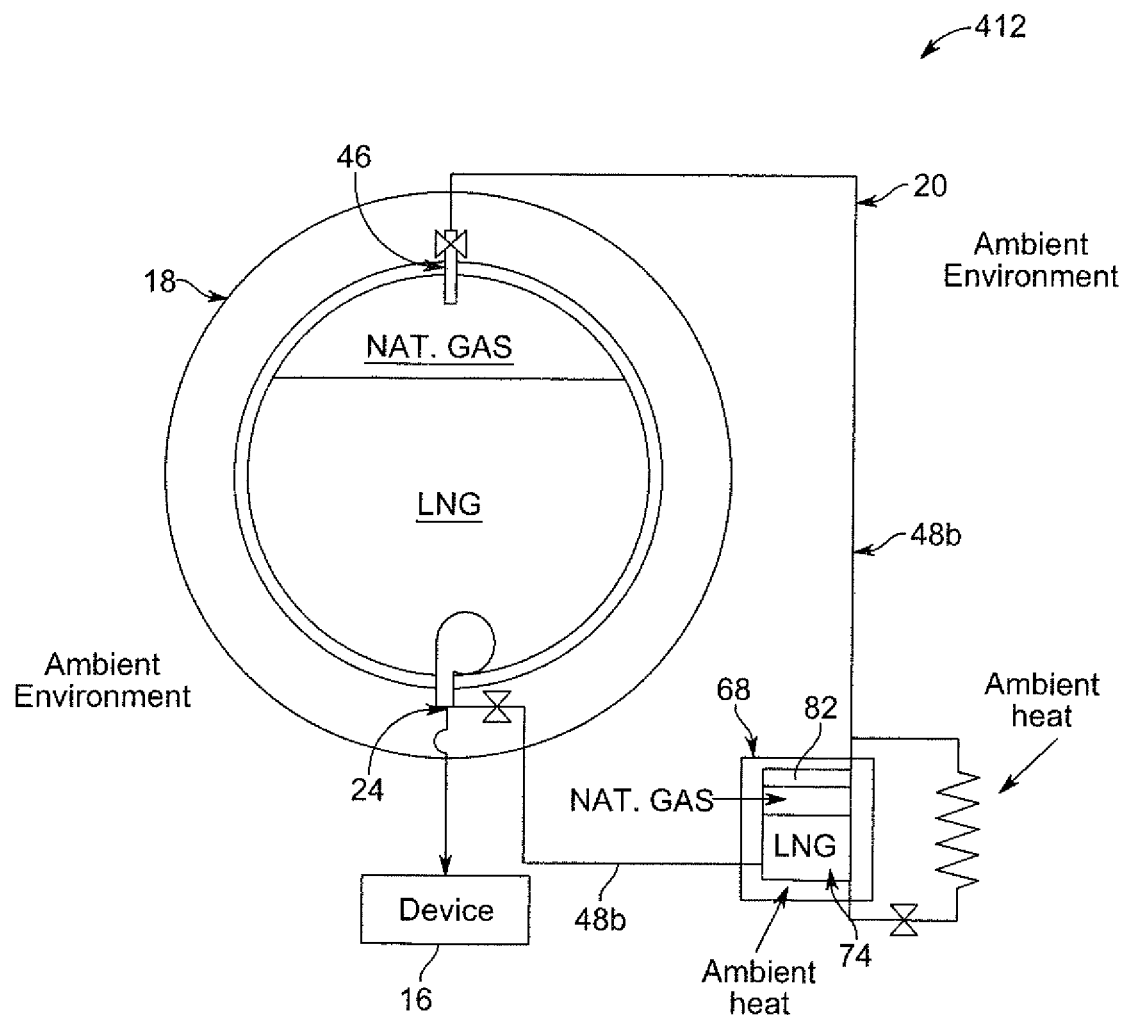
FIG. 7 is schematic diagram of another exemplary embodiment of a cryogenic tank assembly.

The auxiliary tank 68 optionally includes a solid absorbent positioned within the internal chamber 74. For example, FIG. 7 is schematic diagram of another exemplary embodiment of a cryogenic tank assembly 412. The cryogenic tank assembly 412 includes the cryogenic tank 18 and the pressure regulation system 20. The pressure regulation system 20 includes the recirculation conduit 48b and the auxiliary tank 68. The auxiliary tank 68 includes a solid absorbent 82 that is positioned within the internal chamber 74 of the auxiliary tank 68. The solid absorbent 82 absorbs natural gas. The solid absorbent 82 may enable the internal chamber 74 of the auxiliary tank 68 to contain a greater amount of natural gas at a given pressure. Moreover, the solid absorbent 82 may enable the internal chamber 74 to contain a given same amount of natural gas at a lower pressure, which may enable the auxiliary tank 68 to be lighter and/or have thinner walls. The solid absorbent may be any type of solid absorbent that is configured to absorb natural gas.

Figure 8:
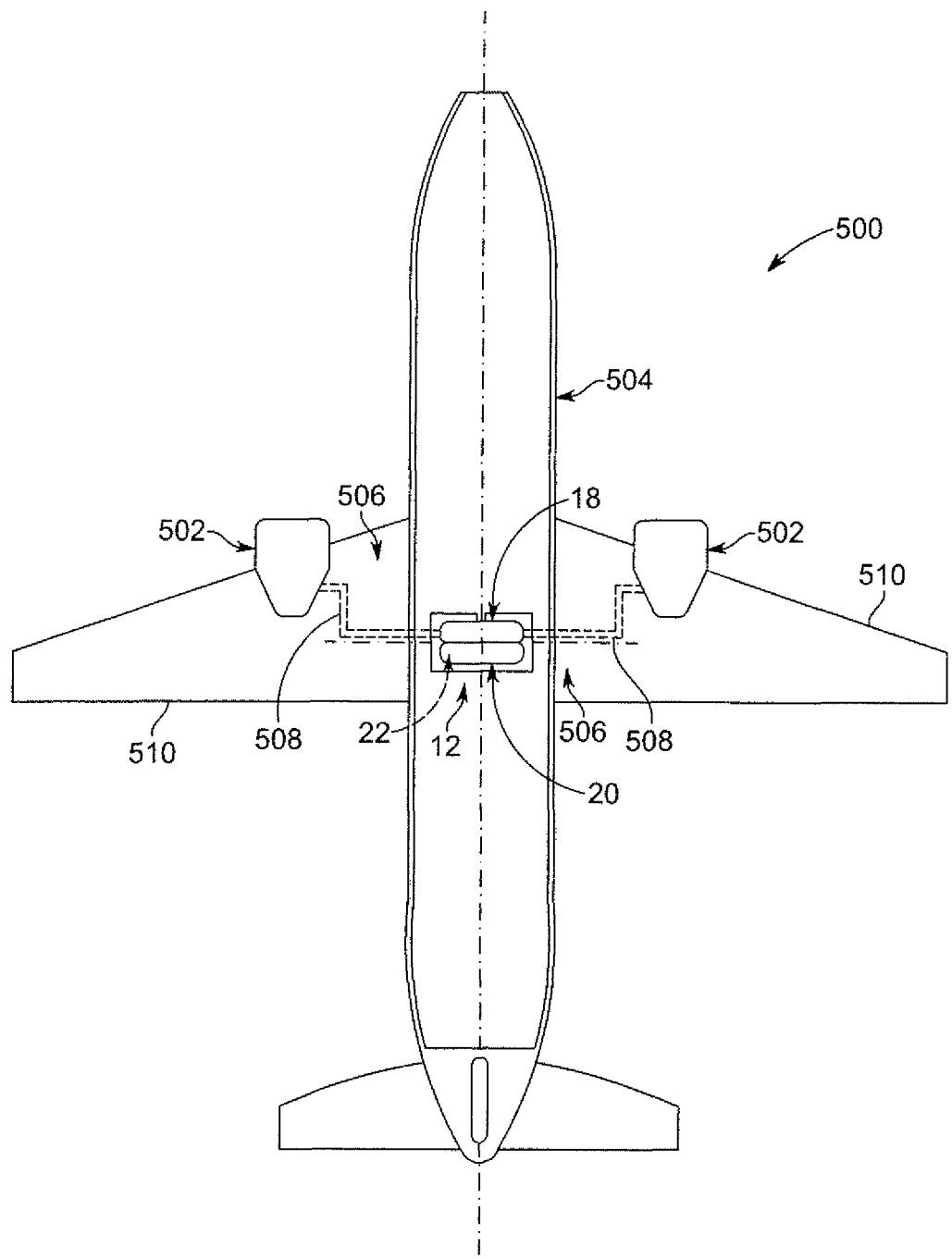
FIG. 8 is a schematic illustration of an embodiment of an aircraft.

As briefly discussed above, the cryogenic tank 18 may be located on-board an aircraft for containing fuel for an engine of the aircraft. For example, FIG. 8 is a schematic illustration of an exemplary embodiment of an aircraft 500 that includes one or more engines 502 that uses natural gas as fuel. The natural gas used as fuel for the engine 502 is contained by a cryogenic tank (e.g., the cryogenic tank 18)

on-board the aircraft 500 as LNG. In the exemplary embodiment of the aircraft 500, the aircraft 500 is a fixed wing passenger airplane.

The aircraft 500 includes an airframe 504 and an engine system 506, which includes the engine 502 and a cryogenic tank assembly (e.g., the cryogenic tank assembly 12, 112, 212, 312, and/or 412). The aircraft 500 will be described and illustrated with respect to the cryogenic tank assembly 12, for clarity. The engine system 506, including the cryogenic tank assembly 12, is located on-board the airframe 504. Specifically, the engine 502, the cryogenic tank assembly 12, and various other components of the engine system 506 are positioned at various locations on and/or within the airframe 504 such that the engine 502, the cryogenic tank assembly 12, and the various other components of the engine system 506 are carried by the airframe 504 during flight of the aircraft 500.

At least one of the engines 502 is operatively connected in fluid communication to receive LNG from the internal volume 22 of the cryogenic tank 18 as natural gas, for example through a fuel conduit system 508. The engines 502 use the natural gas as fuel to generate thrust for generating and controlling flight of the aircraft 500. In some alternative embodiments, the aircraft engine 502 uses LNG as fuel. The engine system 506 may include one or more fuel pumps (e.g., the pump 26 shown in FIGS. 1 and 2). Moreover, in addition or alternative to using natural gas and/or LNG as fuel, each engine 502 may use any other type(s) of fuel, individually or in any combination, such as, but not limited to, a petroleum-based fuel, hydrogen, an alcohol-based fuel, and/or the like. It should be understood that the aircraft 500 may include a fuel tank (not shown) that holds a different type of fuel than natural gas and/or LNG.

Each fuel pump is operatively connected in fluid communication with the internal volume 22 of the cryogenic tank 18 and with one or more corresponding engines 502 for dispensing LNG from the cryogenic tank 18 and delivering the LNG to the engine(s) 502 as natural gas. Each fuel pump may have any location along the airframe 504, such as, but not limited to, within the internal volume 22 of the cryogenic tank 18 as in the exemplary embodiment, mounted to a corresponding engine 502, located proximate a corresponding engine 502, and/or the like. The engine system 506 may include one or more heating and/or other systems (e.g., the evaporator shown in FIG. 1) that heat LNG stored by the cryogenic tank 18 to change the LNG stored by the cryogenic tank 18 to natural gas for supply to the engines 502 as fuel.

Each engine 502 may be any type of engine, such as, but not limited to, a turbine engine, an engine that drives a propeller or other rotor, a radial engine, a piston engine, a turboprop engine, a turbofan engine, and/or the like. Although two are shown, the aircraft 500 may include any number of the engines 502. Although shown located on wings 510 of the airframe 504, each engine 502 may have any other location along the airframe 504. For example, the aircraft 500 may include an engine 502 located at a tail 512 and/or another location along a fuselage 514 of the airframe 504. The aircraft 500 may include any number of the cryogenic tank assemblies 12, 112, 212, 312, and/or 412, each of which may have any location along the airframe 504. Examples of other locations of cryogenic tank assemblies include, but are not limited to, locations within a corresponding wing 510 of the airframe 504.

In some alternative embodiments, the aircraft 500 includes another source (not shown) of LNG besides the cryogenic tank 18, and, instead of being coupled in fluid communication between the outlet 24 (shown in FIGS. 1, 2, 6, and 7) and the inlet 46 (shown in FIGS. 2, 6, and 7) of the cryogenic tank 18, the recirculation conduit 48a and/or 48b (shown in FIGS. 2 and 5-7) is coupled in fluid communication between an outlet (not shown) of the other source of LNG and the inlet 46 of the cryogenic tank 18. In this configuration, the pressure regulation system 20 may be used to inject natural gas into the internal volume 22 of the cryogenic tank 18, to thereby regulation the pressure within the internal volume 22, using LNG from the other source instead, or in addition to, of using LNG from the internal volume 22 of the cryogenic tank 18. In such alternative embodiments as described in this paragraph, the recirculation conduit 48a and/or 48b may be referred to herein as merely a "conduit".

Although the various embodiments of cryogenic tank assemblies are described and illustrated herein as being used a fuel tank on-board an aircraft for containing LNG that is used as fuel for an engine of the aircraft, the various embodiments of cryogenic tanks are not limited to being used with aircraft, and are not limited to being used as a fuel tank. Rather, the various embodiments of cryogenic tank assemblies may be used any application, and may be located on any other stationary and/or mobile platform, such as, but not limited to, buildings, facilities, surface lots, support surfaces (e.g., a floor, the ground, a concrete patch, an asphalt patch, a wooden and/or metal platform, and/or the like), trains, automobiles, watercraft (e.g., a ship, a boat, a maritime vessel, and/or the like), and/or the like. Additionally, the various embodiments of cryogenic tank assemblies are described and illustrated herein with respect to a fixed wing airplane. But, the various embodiments of cryogenic tanks are not limited to airplanes or fixed wing aircraft. Rather, the various embodiments of cryogenic tanks may be implemented within other types of aircraft having any other design, structure, configuration, arrangement, and/or the like, such as, but not limited to, aerostats, powered lift aircraft, and/or rotorcraft, among others.

Figure 9:
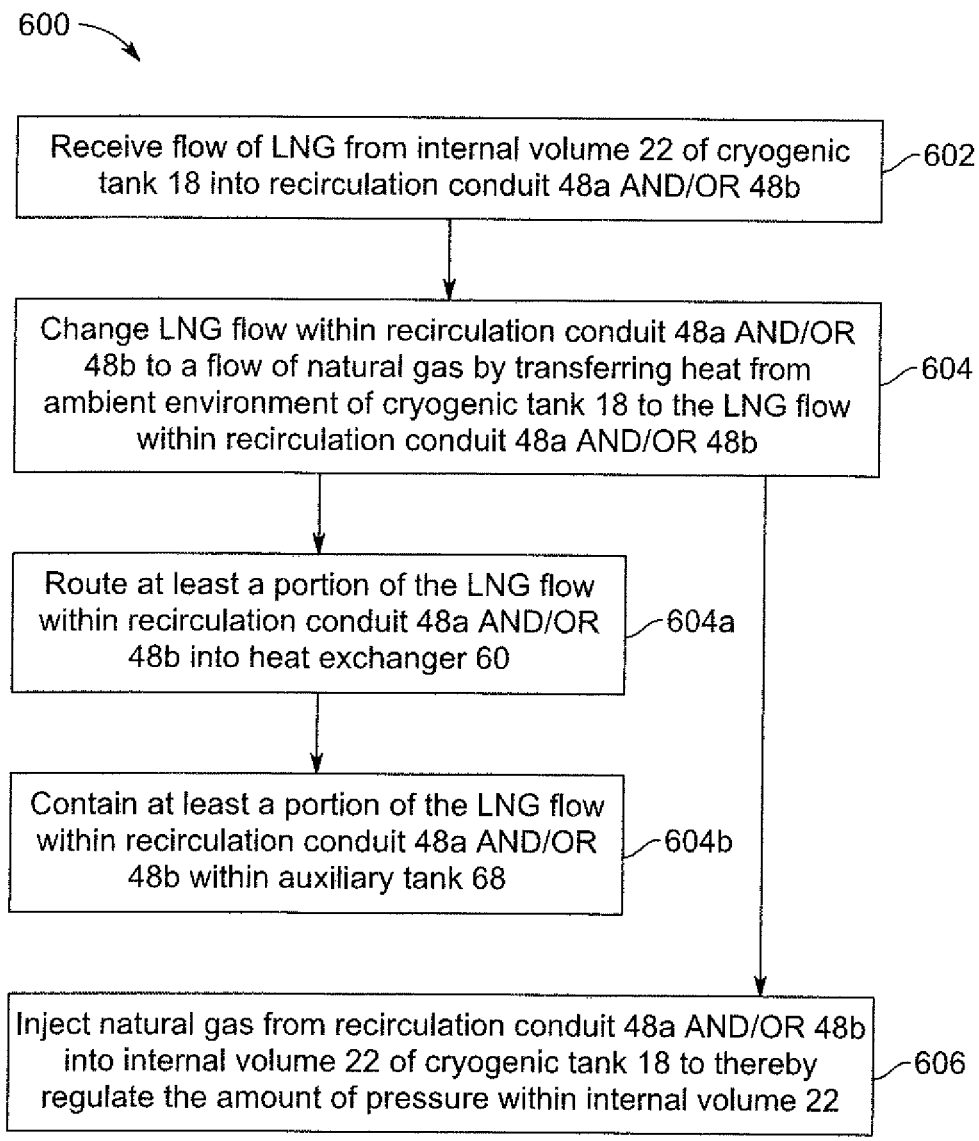
FIG. 9 is a flowchart illustrating an exemplary embodiment of a method for regulating pressure within a cryogenic tank having an internal volume that contains LNG.

FIG. 9 is a flowchart illustrating an exemplary embodiment of a method 600 for regulating pressure within a cryogenic tank (e.g., the cryogenic tank 18) having an internal volume (e.g., the internal volume 22) that contains LNG. The method 600 will be described and illustrated with respect to the cryogenic tank assembly 12, for clarity. The method 600 includes receiving, at 602, a flow of LNG from the internal volume 22 of the cryogenic tank 18 into the recirculation conduit 48a and/or 48b. At 604, the method 600 includes changing the LNG flow within the recirculation conduit 48a and/or 48b to a flow of natural gas by transferring heat from an ambient environment of the cryogenic tank 18 to the LNG flow within the recirculation conduit 48a and/or 48b, for example as described above and illustrated herein. The controller 66 is optionally used to control the flow rate of the LNG flow within the recirculation conduit 48a and/or 48b to regulate an amount of heat absorbed by the LNG flow. At 604a, the method 600 optionally includes routing at least a portion of the LNG flow within the recirculation conduit 48a and/or 48b into the heat exchanger 60. At 604b, the method 600 optionally includes containing at least a portion of the LNG flow within the auxiliary tank 68.

At 606, the method 600 includes injecting the natural gas flow from the recirculation conduit 48a and/or 48b into the internal volume 22 of the cryogenic tank 18 through the inlet 46 of the cryogenic tank 18 to thereby regulate the amount of pressure within the internal volume 22. The controller 66 is optionally used to control the amount and/or pressure of the natural gas flow that is injected into the internal volume 22 from the recirculation conduit 48a and/or 48b.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer", "controller", and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A cryogenic tank assembly comprising:
a cryogenic tank having an internal volume, the cryogenic tank being configured to contain liquefied natural gas (LNG) within the internal volume, the cryogenic tank comprising a first inlet fluidly connected to the internal volume and a first outlet fluidly connected to the internal volume;
a recirculation conduit coupled in fluid communication between the first inlet and the first outlet of the cryogenic tank such that the recirculation conduit fluidly connects the first inlet to the corresponding first outlet, the recirculation conduit extending along a path between the first inlet and a corresponding first outlet external to the internal volume of the cryogenic tank such that the path of the recirculation conduit is configured to be exposed to an ambient environment of the cryogenic tank,
wherein the recirculation conduit comprises a second inlet that is fluidly connected to the first outlet and a second outlet that is fluidly connected to the corresponding first inlet, and
further wherein the recirculation conduit is configured to:
receive a flow of LNG from the internal volume through the first outlet into the second inlet, transfer heat from the ambient environment of the cryogenic tank to the LNG flow to change the LNG flow to a flow of vaporous natural gas, and inject the vaporous natural gas flow into the internal volume of the cryogenic tank through the first inlet and the second outlet, wherein the second inlet comprises at least one first flow control component to control a reception of the flow of LNG and the second outlet comprises at least one second flow control component to control an injection of the flow of vaporous natural gas, wherein the recirculation conduit further comprises:
  a first recirculation conduit that extends along a corresponding path that is a first path, the cryogenic tank comprising a wall that extends a thickness between an internal side and an external side, the external side being configured to be directly exposed to the ambient environment of the cryogenic tank, the first path extending within the thickness of the wall, and
  a second recirculation conduit that extends along a second corresponding path between the first inlet and the first outlet, the second path extending external to the external side such that at least a segment of the second path is configured to extend within the ambient environment of the cryogenic tank in a spaced apart relationship with the external side; and a controller operatively connected to the first recirculation conduit and to the second recirculation conduit such that the controller is configured to control at least one of: the at least one first flow control component, and the at least one second flow control component and thereby regulate a pressure within the internal volume of the cryogenic tank by controlling at least one of: an amount of the natural gas; or a pressure of the natural gas that is injected into the internal volume of the cryogenic tank from the first recirculation conduit and the second recirculation conduit.

2. The assembly of claim 1, wherein the thickness of the wall comprises a thermal insulation, the first path of the first recirculation conduit extending through the thermal insulation of the wall of the cryogenic tank.

3. The assembly of claim 1, wherein the first recirculation conduit comprises a coil that extends around the internal volume within the thickness of the wall such that the first path of the first recirculation conduit comprises a spiral shape.

4. The assembly of claim 1, wherein the first path of the recirculation conduit is configured to be indirectly exposed to the ambient environment through a thermal insulation of the cryogenic tank.

5. The assembly of claim 1, further comprising a heat exchanger coupled in fluid communication with second the recirculation conduit along the second path of the second recirculation conduit, the heat exchanger being configured to transfer heat from the ambient environment to the LNG flow within the second recirculation conduit.

6. The assembly of claim 1, further comprising an auxiliary tank coupled in fluid communication with the second recirculation conduit along the second path of the second recirculation conduit, the auxiliary tank being configured to contain at least a portion of the LNG flow, the auxiliary tank being configured to transfer heat from the ambient environment to LNG contained therein.

7. The assembly of claim 1, further comprising an auxiliary tank coupled in fluid communication with the second recirculation conduit along the second path of the second recirculation conduit, the auxiliary tank being configured to contain at least a portion of the LNG flow within an internal chamber of the auxiliary tank, the auxiliary tank comprising a solid absorbent within the internal chamber.

8. The assembly of claim 1, wherein the controller is operatively connected to a pump, the controller being configured to regulate an amount of heat absorbed by the LNG flow within the recirculation conduit by controlling a flow rate of the LNG flow using the pump.

9. The assembly of claim 1, wherein the at least one first flow control component comprises at least one of: at least one valve, at least one nozzle, at least one restrictor, at least one venturi, at least one check valve, at least one sensor, at least one manual shutoff, and at least one automatic shutoff.

10. The assembly of claim 1, wherein the at least one second flow control component comprises at least one of: at least one valve, at least one nozzle, at least one restrictor, at least one venturi, at least one check valve, at least one sensor, at least one manual shutoff, and at least one automatic shutoff.

* * * * *